United States Patent
Makke et al.

(10) Patent No.: US 11,199,251 B2
(45) Date of Patent: Dec. 14, 2021

(54) ORBITALLY FORMED HYPOID PINION GEAR

(71) Applicant: Schaeffler Technologies AG & Co. KG, Herzogenaurach (DE)

(72) Inventors: Alaa Makke, Farmington Hills, MI (US); Cameron Gibson, Royal Oak, MI (US); Stefan Tojcic, Windsor (CA); Kyle Hassay, Belle River (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/721,013

(22) Filed: Dec. 19, 2019

(65) Prior Publication Data
US 2021/0190189 A1 Jun. 24, 2021

(51) Int. Cl.
| | |
|---|---|
| F16H 48/42 | (2012.01) |
| F16H 48/08 | (2006.01) |
| F16H 48/40 | (2012.01) |
| F16H 57/037 | (2012.01) |
| B60K 17/16 | (2006.01) |
| F16H 48/38 | (2012.01) |
| F16H 57/021 | (2012.01) |

(52) U.S. Cl.
CPC .............. F16H 48/08 (2013.01); F16H 48/40 (2013.01); *B60K 17/16* (2013.01); *F16C 2361/61* (2013.01); *F16H 57/021* (2013.01); *F16H 57/037* (2013.01); *F16H 2048/082* (2013.01); *F16H 2048/085* (2013.01); *F16H 2048/385* (2013.01); *F16H 2048/426* (2013.01)

(58) Field of Classification Search
CPC ........ F16H 2048/426; F16C 35/06–063; F16C 2229/00; F16C 2226/52
See application file for complete search history.

(56) References Cited

U.S. PATENT DOCUMENTS

| | | | | |
|---|---|---|---|---|
| 2,699,075 A | * | 1/1955 | Buckendale | B60K 17/36 180/24.09 |
| 2,923,173 A | * | 2/1960 | Hoffman | B60K 17/22 475/160 |
| 2,971,398 A | * | 2/1961 | Sieving | F16H 57/037 74/606 R |
| 3,006,426 A | * | 10/1961 | Popiel | F16H 48/08 180/24.04 |
| 3,572,154 A | * | 3/1971 | Bartolomucci | F16H 48/06 74/424 |
| 3,792,625 A | | 2/1974 | Asberg | |

(Continued)

FOREIGN PATENT DOCUMENTS

GB 2563210 A * 12/2018 ........... F16H 57/021

*Primary Examiner* — Sherry L Estremsky

(57) ABSTRACT

A pinion shaft assembly facilitates assembly of an automotive differential. An angular contact double row ball bearing is assembled to an outer surface of a hollow pinion shaft. An axial pre-load is established and maintained by orbitally forming an outwardly turned portion of the hollow pinion shaft. In some embodiments, the two inner rings are assembled to the pinion shaft. In other embodiments, a raceway may be formed directly on an outer surface of the pinion shaft to eliminate one of the inner rings. The pinion shaft includes a spline, such as an axial spline or a face spline, for fixation to a driveshaft.

8 Claims, 3 Drawing Sheets

(56) References Cited

U.S. PATENT DOCUMENTS

| | | | | |
|---|---|---|---|---|
| 5,094,655 | A * | 3/1992 | Sato | B60K 17/16 |
| | | | | 384/246 |
| 6,702,472 | B2 * | 3/2004 | Sera | B60B 27/00 |
| | | | | 384/489 |
| 6,796,714 | B2 * | 9/2004 | Ohkuma | F16C 35/063 |
| | | | | 384/585 |
| 7,988,583 | B2 * | 8/2011 | Hirase | B60K 17/16 |
| | | | | 475/225 |
| 8,066,337 | B2 * | 11/2011 | Tsuzaki | B60B 27/0026 |
| | | | | 301/105.1 |
| 8,382,378 | B2 * | 2/2013 | Fukumura | F16C 35/0635 |
| | | | | 384/544 |
| 8,591,118 | B2 * | 11/2013 | Ishijima | F16D 1/108 |
| | | | | 384/544 |
| 9,157,515 | B2 * | 10/2015 | Downs | F16H 48/40 |
| 9,656,517 | B2 | 5/2017 | Mochinaga et al. | |
| 9,829,048 | B2 * | 11/2017 | Mochinaga | B60B 27/0005 |
| 10,539,214 | B2 * | 1/2020 | Bujold | F16H 48/08 |

* cited by examiner

ORBITALLY FORMED HYPOID PINION GEAR

TECHNICAL FIELD

The disclosure relates to a pinion shaft assembly for an automotive differential. More particularly, the disclosure relates to a pinon shaft which is orbitally formed to establish and maintain a preload in a double row angular contact bearing.

BACKGROUND

Automotive differentials transmit power from a driveshaft to left and right half-shafts while permitting the half-shafts to have slightly different speeds. A pinion shaft is supported for rotation with respect to a differential shaft by a bearing and includes a pinion gear on the interior of the housing. The pinion gear meshes with a differential ring gear to provide a final drive gear reduction ratio. The pinion shaft must be assembled to the driveshaft for common rotation.

SUMMARY

A pinion gear assembly includes a hollow pinion shaft, an outer ring, a first inner ring, and two sets of rollers, such as balls. The hollow pinion shaft has a pinion gear, such as a hypoid gear, at a first end. The first inner ring is radially outside the pinion shaft. The first set of rollers is between the pinion shaft and the outer ring. The first set of rollers may bear directly on the pinion shaft or may bear against a second inner ring which axially bears against an exterior shelf of the pinion shaft. The second set of rollers is between the first inner ring and the outer ring. A wall of the pinion shaft is plastically deformed outward at a second end applying an axial pre-load, via the first inner ring, on the first and second sets of rollers. An internal spline may be formed on an interior of the pinion shaft. Alternatively, a face spline may be formed on the outwardly turned portion of the pinion shaft.

A method of manufacturing a differential pinion gear assembly includes providing a hollow pinion shaft, inserting two sets of rollers, an outer ring, and at least one inner ring onto the pinion shaft, and plastically deforming the pinion shaft. The hollow pinion shaft has a pinion gear formed on a first end. The two sets of rollers, outer ring, and at least one inner ring are inserted from a second end of the pinion shaft. The second end of the pinion shaft is plastically deforming outwardly, thereby applying an axial pre-load to the first and second pluralities of rollers. The first set of rollers bear axially against the outer ring and the second set of rollers bear axially against the first inner ring. The method may further include inserting a second inner ring from the second end such that the second inner ring bears axially against a shelf of the pinion shaft and the first plurality of rollers bears axially against the second inner ring. Alternatively, the pinion shaft may include a raceway and the first plurality of rollers may directly bear axially against the raceway. An axial spline may be formed on an interior surface of the hollow pinion shaft. Alternatively, a face spline may be formed in the outwardly plastically deformed portion of the pinion shaft.

A differential includes a housing, differential gearing, and a pinion gear assembly as described above. The differential gearing is configured to distribute power from a ring gear to a left half-shaft and a right-half shaft. The pinion gear of the pinion gear assembly meshes with the ring gear.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
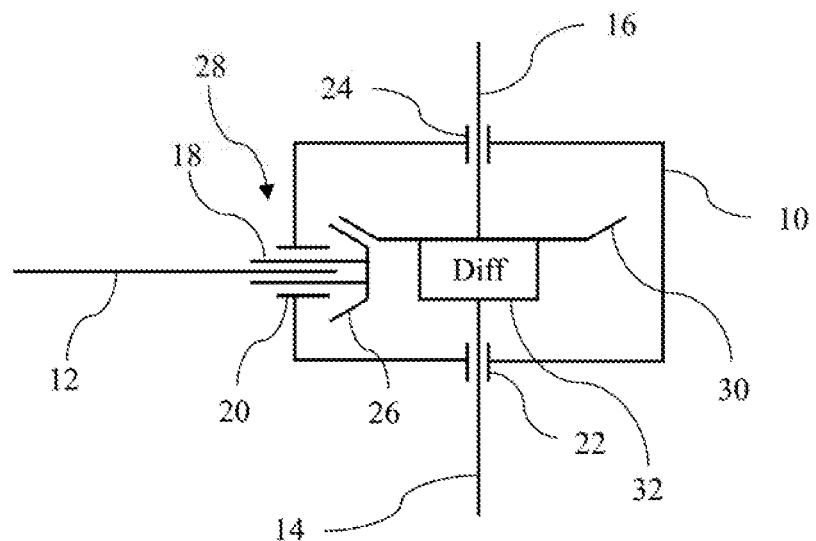
FIG. 1 is a schematic illustration of an automotive differential.

FIG. 1 is a schematic diagram of a vehicle differential, such as a rear differential of a rear-wheel-drive vehicle or a front differential of a four-wheel-drive vehicle. The differential includes a housing 10. Power is transmitted from an engine and transmission, and sometimes a transfer case, via driveshaft 12. The differential delivers the power to left and right half-shafts 14 and 16, which in turn transmit the power to left and right drive wheels. Driveshaft 12 is fixed to a pinion shaft 18 which is supported for rotation with respect to housing 10 by bearing 20. Half-shafts 14 and 16 are supported for rotation with respect to housing 10 by bearings 22 and 24 respectively. A beveled pinion gear 26 is fixed to pinion shaft 18. Pinion shaft 18, bearing 20, and pinion gear 26 may collectively be called a pinion gear assembly 28. Pinion gear 18 meshes with beveled ring gear 30. Beveled gears 26 and 30 may be hypoid gears in which the axes of rotation are offset. Differential gearing 32 divides the power between half-shafts 14 and 16, while allowing half-shafts 14 and 16 to differ in speed, such as when a vehicle turns a corner. Differential gearing 32 transmits approximately equal torque to the half-shafts. One type of differential gearing includes beveled planet gears supported for rotation with respect to a carrier fixed to ring gear 28 and meshing with beveled side gears fixed to half-shafts 14 and 16.

Figure 2:
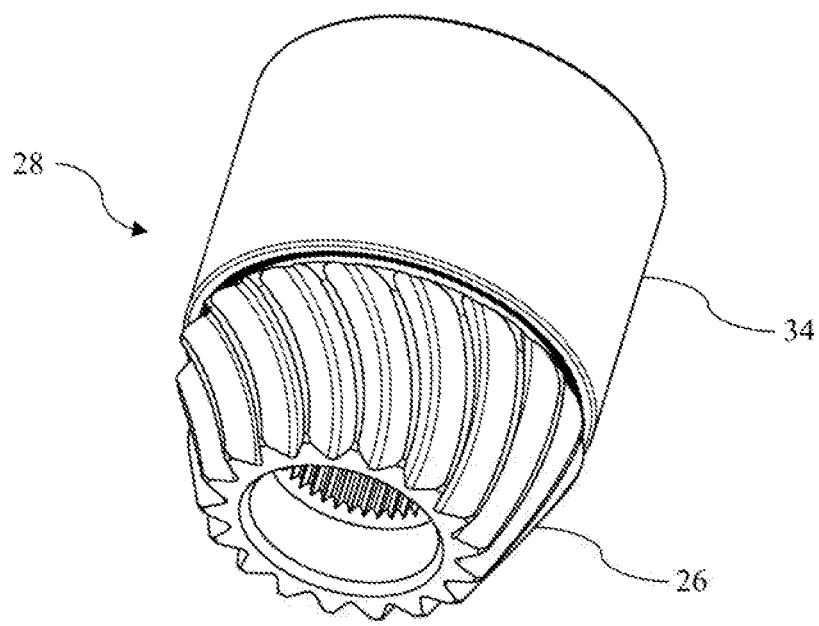
FIG. 2 is a pictorial view of a first pinion shaft assembly suitable for use in the differential assembly of FIG. 1.
Figure 3:
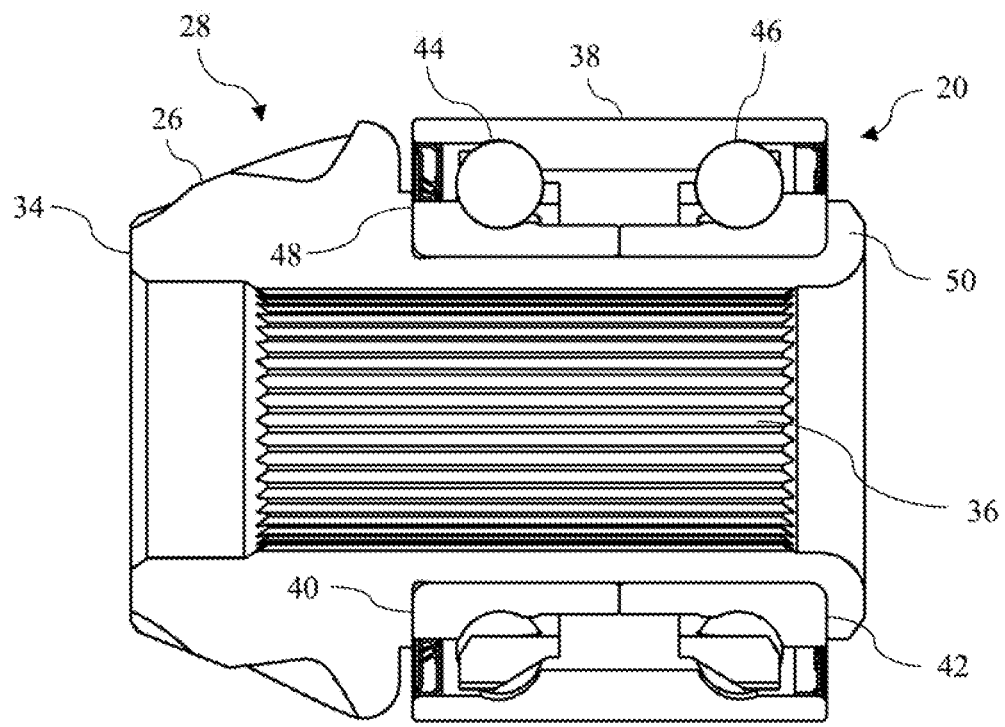
FIG. 3 is a cross section of the first pinion shaft assembly of FIG. 2.

FIG. 2 is a pictorial view of pinion gear assembly 28. FIG. 3 is a cross section of a pinion gear assembly 28. The pinion shaft 34 is hollow. An interior surface of pinion shaft 34 includes an axial spline 36 for joining the pinion shaft to drive shaft 12. Pinion gear 26 is fixed to or integrally formed with shaft 34. A double row, angular contact ball bearing 20 is assembled to an outer surface of shaft 34. Bearing 20 includes an outer ring 38 and two inner rings 40 and 42. Two raceways are formed in out race 38, one facing diagonally inward and forward and the other facing diagonally inward and rearward. A raceway is formed in inner ring 40 facing diagonally outward and rearward. A first set of rollers 44 is placed between inner ring 40 and outer ring 38. A raceway is formed in inner ring 42 facing diagonally outward and forward. A second set of rollers 46 is placed between inner ring 42 and outer ring 38. An axial pre-load is established from inner ring 40, through rollers 44, outer ring 38, and rollers 46 to inner ring 42. To maintain this pre-load, inner ring 40 reacts axially against a shelf 48 of shaft 34 and inner ring 42 reacts against an outwardly turned portion 50 of shaft 34.

The pinion gear assembly 28 is pre-assembled before it is installed in the differential. First, the pinion shaft 34 is fabricated without the outwardly turned portion 50. Pinion gear 26, shelf 48, and axial spline are then machined. Bearing 20 may be assembled separately and then slid onto pinion shaft 34 from the end opposite gear 26. Then, an orbital forming operation is used to form the outwardly turned portion and to apply the desired axial pre-load to the bearing 20.

Figure 4:
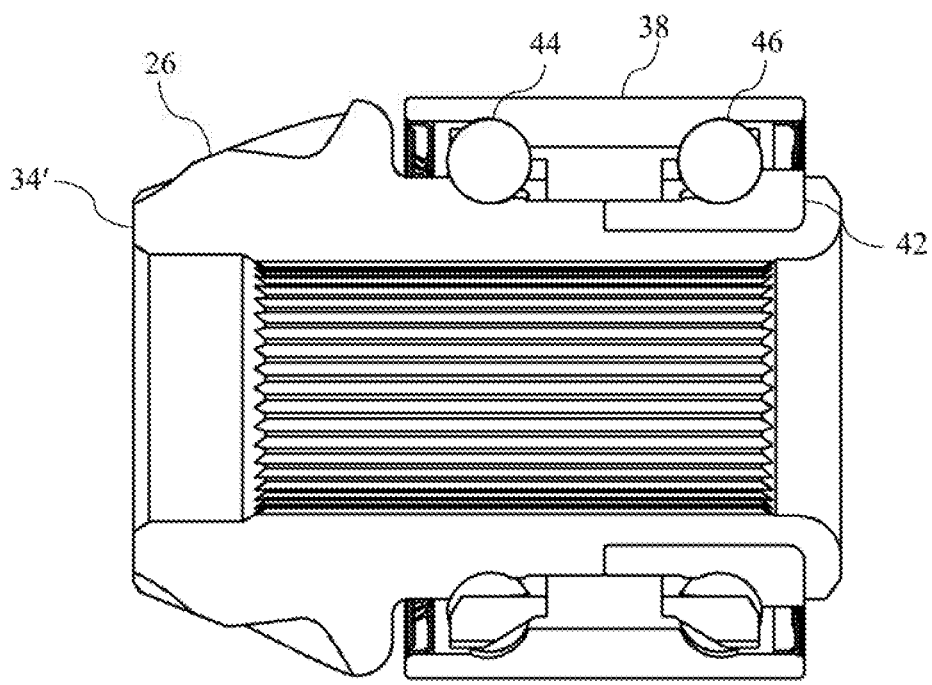
FIG. 4 is a cross section of a second pinion shaft assembly suitable for use in the differential assembly of FIG. 1.

FIG. 4 illustrates a second embodiment. Pinion shaft 34' is similar in most respects to pinion shaft 34 of FIGS. 2-3. However, instead of having a shelf 48 to axially retain inner ring 40, a raceway for rollers 44 is formed directly in an outer surface of shaft 34'.

Figure 5:
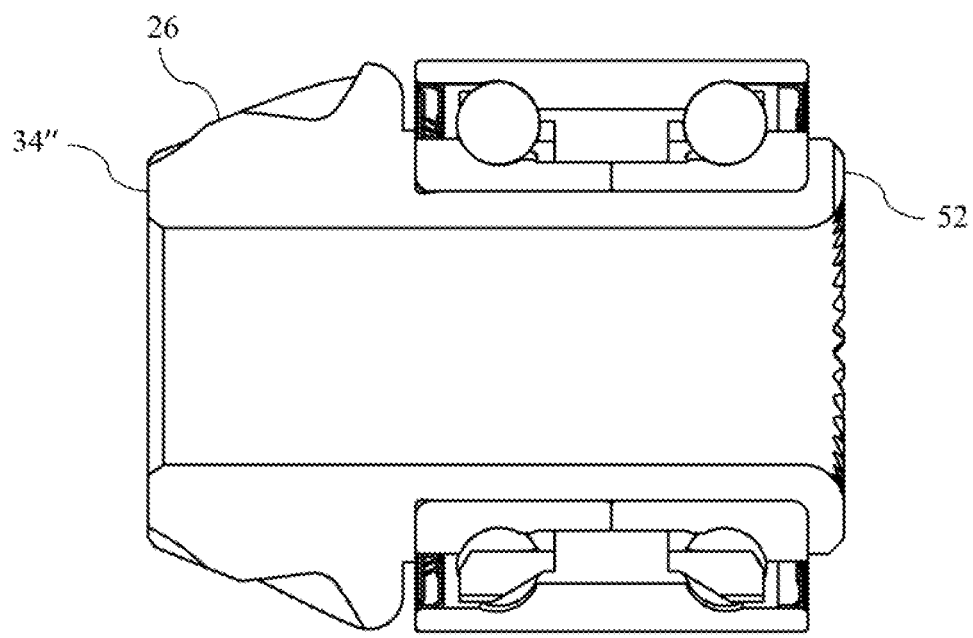
FIG. 5 is a cross section of a third pinion shaft assembly suitable for use in the differential assembly of FIG. 1.
Figure 6:
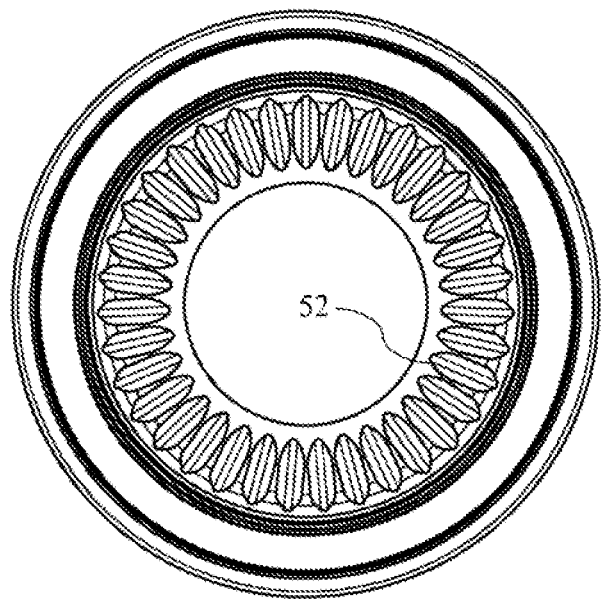
FIG. 6 is an end view of the third pinion shaft assembly of FIG. 5.

FIGS. 5 and 6 illustrate a third embodiment. Pinion shaft 34" is similar in most respect to pinion shaft 34 of FIGS. 2-3. However, instead of axial spline 36, a face spline 52 is formed in the end of pinion shaft 34". The face spline is formed after the orbital forming operation forms the outwardly turned portion to apply the desired axial pre-load to the bearing 20. A person of skill in the art will recognize that the variations of FIGS. 4 and 5 may be used in combination with one another.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A pinion gear assembly comprising:
   a hollow pinion shaft having a pinion gear at a first end;
   an outer ring;
   a first inner ring radially outside the pinion shaft;
   a second inner ring radially outside the pinion shaft bearing axially against an exterior shelf of the pinion shaft;
   a first plurality of rollers between the second inner ring and the outer ring; and
   a second plurality of rollers between the first inner ring and the outer ring; and wherein
   a wall of the pinion shaft is plastically deformed outward at a second end applying an axial pre-load, via the first inner ring, on the first and second sets of rollers and wherein a face spline is formed on an outwardly turned portion of the pinion shaft.

2. The pinion gear assembly of claim 1 wherein the pinion gear is a hypoid gear.

3. The pinion gear assembly of claim 1 wherein the rollers of the first and second pluralities of rollers are balls.

4. A method of manufacturing a differential pinion gear assembly comprising:
   providing a hollow pinion shaft having a pinion gear formed on a first end;
   inserting, from a second end, a second inner ring, a first plurality of rollers, an outer ring, a second plurality of rollers, and a first inner ring, the second inner ring bearing axially against a shelf of the pinion shaft;
   plastically deforming the second end outward to apply an axial pre-load to the first and second pluralities of rollers, wherein the first and second pluralities of rollers bear axially against the outer ring, the first plurality of rollers bear axially against the second ring, and the second plurality of rollers bears axially against the first inner ring; and
   forming a face spline in the outwardly plastically deformed portion of the pinion shaft.

5. The method of claim 4 wherein the rollers of the first and second pluralities of rollers are balls.

6. The method of claim 4 further comprising:
   fixing the outer ring to a differential housing; and
   meshingly engaging the pinion gear with a differential ring gear.

7. A differential comprising:
   a housing;
   differential gearing configured to distribute power from a ring gear to a left half-shaft and a right-half shaft;
   a hollow pinion shaft having a pinion gear at a first end meshing with the ring gear;
   an outer ring fixed to the housing;
   a first inner ring radially outside the pinion shaft;
   a second inner ring radially outside the pinion shaft and bearing axially against an exterior shelf of the pinion shaft;
   a first plurality of rollers between the second ring and the outer ring; and
   a second plurality of rollers between the first inner ring and the outer ring; and wherein a wall of the pinion shaft is plastically deformed outward at a second end to apply an axial pre-load, via the first inner ring, on the first and second sets of rollers; and a face spline is formed on the outwardly turned wall of the pinion shaft.

8. The differential of claim 7 wherein the pinion gear is a hypoid gear.

\* \* \* \* \*